United States Patent
Minnich et al.

(10) Patent No.: US 7,591,309 B2
(45) Date of Patent: Sep. 22, 2009

(54) METHOD FOR PRODUCTION OF HIGH PRESSURE STEAM FROM PRODUCED WATER

(75) Inventors: Keith R. Minnich, Pewaukee, WI (US); Mark C. Nicholson, Pewaukee, WI (US); RamKumar Karlapudi, Lake Mary, FL (US); Richard M. Schoen, Hartland, WI (US)

(73) Assignee: Aquatech International Corporation, Canonsburg, PA (US)

( * ) Notice: Subject to any disclaimer, the term of this patent is extended or adjusted under 35 U.S.C. 154(b) by 257 days.

(21) Appl. No.: 10/580,812

(22) PCT Filed: Nov. 24, 2004
(Under 37 CFR 1.47)

(86) PCT No.: PCT/US2004/039515

§ 371 (c)(1),
(2), (4) Date: Aug. 1, 2007

(87) PCT Pub. No.: WO2005/054746

PCT Pub. Date: Jun. 16, 2005

(65) Prior Publication Data

US 2008/0110630 A1    May 15, 2008

Related U.S. Application Data

(60) Provisional application No. 60/525,578, filed on Nov. 26, 2003.

(51) Int. Cl.
*E21B 43/24* (2006.01)
*E21B 43/34* (2006.01)
*E21B 43/40* (2006.01)

(52) U.S. Cl. .............. 166/266; 159/47.1; 159/47.3; 166/267; 166/272.3; 166/303; 210/652; 210/664; 210/774; 210/806

(58) Field of Classification Search ............. 166/272.3
See application file for complete search history.

(56) References Cited

U.S. PATENT DOCUMENTS

| | | | | |
|---|---|---|---|---|
| 3,844,349 A | * | 10/1974 | Snavely et al. | 166/272.3 |
| 3,918,521 A | * | 11/1975 | Snavely et al. | 166/272.3 |
| 4,007,786 A | * | 2/1977 | Schlinger | 166/266 |
| 4,418,651 A | | 12/1983 | Wyatt et al. | |
| 4,474,011 A | * | 10/1984 | Nelson et al. | 60/648 |
| 4,730,577 A | | 3/1988 | Houghton et al. | |
| 4,913,236 A | * | 4/1990 | Reed | 166/303 |
| 6,536,523 B1 | * | 3/2003 | Kresnyak et al. | 166/266 |
| 6,675,747 B1 | | 1/2004 | Goidich et al. | |
| 6,733,636 B1 | | 5/2004 | Heins | |
| 2003/0127226 A1 | | 7/2003 | Heins | |
| 2005/0022989 A1 | * | 2/2005 | Heins | 166/272.3 |

* cited by examiner

*Primary Examiner*—George Suchfield
(74) *Attorney, Agent, or Firm*—Andrus, Sceales, Starke & Sawall, LLP

(57) ABSTRACT

An evaporation based method for generation of high pressure steam from produced water in the heavy oil production industry. De-oiled produced water is processed through a high pH/high pressure evaporator driven by a commercial water-tube boiler. The vapor produced by the evaporator is suitable for the steam assisted gravity drainage (SAGD) method being utilized by heavy oil recovery installations, without the use of once through steam generators that require extensive chemical treatment, and without requiring atmospheric distillation, which requires high power consuming compressors. Evaporator blowdown may be further treated in a crystallizing evaporator to provide a zero liquid discharge (ZLD) system and, with most produced waters, at least 98% of the incoming produced water stream can be recovered in the form of high pressure steam.

34 Claims, 7 Drawing Sheets

Figure 6

TYPICAL ONCE THROUGH STEAM GENERATOR FEEDWATER REQUIREMENTS

|  |  |
|---|---|
| Chlorides | <1000 mg/l |
| Hardness (as $CaCO_3$) | <0.5 mg/l normal<br><1.0 mg/l maximum |
| Oil and Grease | <0.5 mg/l normal<br><1.0 mg/l maximum |
| TDS | <2500 mg/l |
| Silica (as $SiO_2$) | <80 mg/l |
| TSS | <1.0 mg/l |
| Iron (as Fe) | <0.1 mg/l |
| pH | 9.0 – 10.0 |
| $H_2S$ | <0.1 mg/l |
| Oxygen | Zero |

Figure 7

TYPICAL 1000 PSIG WATERTUBE BOILER ASME FEED and BOILER WATER REQUIREMENTS

| Feedwater |  |
|---|---|
| Hardness (as $CaCO_3$) | <0.05 mg/l |
| Non-Volatile TOC (as C) | <0.20 mg/l |
| Oil and Grease | <0.20 mg/l |
| Copper (as Cu) | <0.01 mg/l |
| pH | 8.8 – 9.6 |
|  |  |
| Boiler Water |  |
| Silica (as $SiO_2$) | <6 mg/l |

METHOD FOR PRODUCTION OF HIGH PRESSURE STEAM FROM PRODUCED WATER

CROSS-REFERENCE TO RELATED APPLICATIONS

This application is the U.S. national stage application of International Application PCT/US2004/039515, filed 24 Nov. 2004, which international application was published on Jun. 16, 2005, as International Publication No. WO 2005/054746 in the English language. The International Application claims priority of U.S. Provisional Application No 60/525,578 filed on 26 Nov. 2003.

TECHNICAL FIELD

This process relates generally to a method and to a water evaporation system for the treatment of produced waters and high quality steam generation for operations that utilize high-pressure steam to recover oil from geological formations.

BACKGROUND OF THE INVENTION

Oil producers utilize different means to produce steam for injection into the oil bearing formation. The steam that is injected into the geologic formation condenses by direct contact heat exchange, thus heating the oil and reducing its viscosity. The condensed steam and oil are collected in the producing well and pumped to the surface. This oil/water mixture, once the oil has been separated from it, is what is referred to as 'produced water' in the oil industry.

Since water can comprise up to 90% of every barrel of oil/water mixture removed from the formation, the recovery and reuse of the water is necessary to control the cost of the operation and to minimize the environmental impact of consuming raw fresh water and subsequently generating wastewater for disposal. Once the decision to recover water is made, then treatment of those produced waters is required to reduce the scaling and/or organic fouling tendency of the water. This treatment generally requires the removal of the hardness and other ions present in the stream, preferably to near zero. As is understood in the art, the 'hardness' causing ions are the combined calcium and magnesium salts in the water to be used in steam generation equipment and is typically expressed as parts per million (ppm) although other terms can be used. While silica is not considered as adding to the hardness value, its presence can also lead to scaling problems if present in other than minimal amounts.

The traditional method for generation of steam in enhanced oil recovery is to utilize a once-through steam generator (OTSG) in which steam is generated from a treated feedwater through tubes heated by gas or oil burners. The OTSG feedwater can have a total dissolved solids concentration as high as 12,000 ppm (as CaCO3 equivalent), but requires a hardness level that is near zero. This method produces a low quality or wet steam, which is 80% vapor and 20% liquid, at pressures ranging from 600 pounds per square inch gauge (psig) up to 2000 psig. This 80% quality steam is separated from the 20% water and then injected into the formation. Either a portion or all of the 20% blowdown is disposed as a wastewater. Another method that has been proposed to obtain the high quality steam requirement is using a water tube boiler instead of the OTSG to generate steam. The water tube boiler, however, requires an even greater amount of feedwater pretreatment than the OTSG to ensure problem free operation. For a comparison of the feedwater requirements for both OTSG and water tube boilers, refer to FIGS. 6 and 7. There are numerous ways to obtain the feedwater quality required for steam generation, several of which are outlined below for illustration.

The oil/water mixture coming out of the production well is sent to the primary oil-water separator where substantially all of the oil is separated from the produced water. This separator can be comprised of any known apparatus, but typically, it is comprised of one or more free-water-knock-outs (FWKO), which allow separation of the oil and water by gravity. The separated oil is further treated to remove the last of the water and then sent to storage.

The separated produced water is sent to a cone bottom tank where heavy solids, such as sand, are allowed to settle out and any remaining oil rises to the top for removal. If any substantial oil remains after this step, one or more induced gas flotation units are utilized to remove substantially all of the oil present in the produced water. Alternately, a de-oiling polymer can be used with a resultant waste oil/solids sludge, which needs further handling for disposal.

The de-oiled produced water stream is then further treated for reuse. Its constituents are variable but typically it is relatively high in total dissolved solids (TDS), total organic carbon (TOC), hardness, and silica. The water treatment plant schemes which have heretofore been utilized downstream of the de-oiling zone and upstream of the steam injection well, as well as the equipment which is necessary or desirable to obtain high quality steam at 600 psig, or greater, is the focus of the improvements explained and described in this disclosure.

Referring to FIG. 1, which outlines a typical prior art process used to obtain high quality steam for down hole injection, the raw produced water 6 is sent to a de-oiling process zone 8 and then to a warm lime softener 310. Chemicals 312 such as $Ca(OH)_2$, $Na_2CO_3$, MgO, NaOH, and a coagulant are introduced into the lime softener depending on the reaction desired and a precipitate consisting of hardness and silica is generated. Following the lime softener, a media type filter 324 is utilized to remove the small suspended solids that were not caught up in the lime sludge. The partially softened produced water, still saturated in calcium (as $CaCO_3$), is then further de-ionized in a weak acid cation (WAC) exchanger 18 which essentially removes all remaining divalent ions. The softened produced water is then sent to the once through steam generator 230, via a conduit that passes through pre-heaters (4 and 76), and 80% quality steam 236 is generated. A steam separator 240 removes the 20% water entrainment and produces high quality steam 100 for down-hole injection in the steam flooding process. The high temperature blowdown 96 from the steam separator is then sent to a series of flash tanks to provide progressively lower steam pressures for other uses. If zero liquid discharge is desired, then the flash steam 134 can be used in a steam driven multiple effect evaporator and crystallizer 140 to obtain a zero liquid discharge (ZLD) system.

This prior art method is known technology and is considered to be the industry standard. However, it carries with it several disadvantages. These are:

1. It has the highest chemical cost of any options
2. It has the highest cost for sludge and salt cake disposal requirements
3. The OTSG's are limited by the 80% conversion of water into steam
4. The OTSG has inherent design problems in terms of tube wetting, fouling, and scaling
5. In cold weather operations, the sludge from the lime softener becomes very hard to handle 6. In the event of an unscheduled maintenance shutdown, the sludge in the lime softener can quickly set up in a form similar to concrete and become very hard to remove from the system.

FIG. 2 depicts another current prior art process in which the lime soda softening, media filter, and polishing WAC are replaced by a mechanical vapor compressor evaporator (MVC) 244. The de-oiled produced water 14 may be treated with an acid such as hydrochloric (HCl) to lower the pH and destroy any non-hydroxide alkalinity present. Any non-condensable gasses (NCG) 58 present may be removed in deaerator 56. Caustic such as sodium hydroxide (NaOH) 62 may then be added to raise the pH to around 10 or higher. The MVC evaporator 244 produces a low TDS distillate stream 246 that is used to feed the OTSG 230 and the process of generating high pressure steam for down-hole injection is accomplished in the same manner as in FIG. 1. In this case, the blowdown 96 from the steam separator 240 is flashed to a steam driven crystallizer 252 which concentrates the brine blowdown 248 from the MVC evaporator 244 and thus provides a ZLD system. The low TDS vapor produced in crystallizer 162 is routed through conduit 166, where it is combined with the liquid portion 138 exiting the flash tank 130, and then to the OTSG feed storage tank 36.

While this process seems to provide a simple approach to providing high quality water to the OTSG, it has limited applicability in that the concentration of the hardness causing ions, such as calcium and magnesium, must be quite low in the raw produced water. If the hardness ions are not low, then the MVC is limited in the concentration factor obtainable, scale control chemicals are required, or it has to operate in the seeded-slurry mode to avoid calcium sulfate and silica scaling. In the seeded-slurry mode, calcium chloride ($CaCl_2$) and/or sodium sulfate ($Na_2SO_4$) has to be added to the feed stream to ensure that a circulating magma of calcium sulfate ($CaSO_4$) crystals, typically 3-10% suspended solids (SS), is maintained in the MVC evaporator 244. This circulating magma is used as precipitation sites for the incoming calcium ions and for the co-precipitation of silica. This seeded-slurry mode of operation is aptly taught in U.S. Pat. No. 4,618,429.

The disadvantages to this system are:
1. Power consumption is high due to MVC evaporator compressor
2. A very large electrical infrastructure is required to supply power to the MVC evaporator compressors
3. Suppliers of OTSG equipment are reluctant to design to greater than 80% quality steam even with high quality feed water
4. OTSG tube wetting problems
5. Applicability is limited to low calcium and low magnesium produced waters due to high pH requirements for silica solubility and even when low, acid cleanings are required to maintain evaporator efficiency by removing the $CaCO_3$ scale that builds up.
6. The evaporator is subject to scaling from low solubility constituents in the evaporator feed like strontium, barium and complexes of metals that occur at high pH operation.

FIG. 3 is yet another prior art process that utilizes a MVC evaporator 244 to pre-treat the de-oiled produced water in the same manner as that shown in FIG. 2. In this case though, the high quality distillate 246 from the MVC 244 is cooled in heat exchanger 280 and sent via conduit 284 to a reverse osmosis unit (RO) 290 that removes the volatile TOC from it. The RO permeate 294 is then suitable for use by a high efficiency water tube boiler 110 that will produce high quality steam. The need for a steam separator system and blowdown condensate system is eliminated. Likewise, the inherent problems of an OTSG are thus eliminated and a greater conversion of water to steam is obtained. The blowdown from the boiler is directed to the MVC (262). The steam driven ZLD system of the preceding figures has to be eliminated in favor of a MVC driven system as the amount of blowdown from the water tube boiler is insufficient to support a steam driven evaporator. Due to compressor limitations, an MVC crystallizer 268 is also required for final concentration. On some produced waters, notably those with minimal non-volatile TOC, the RO system 290 is not required and the MVC distillate 246 is directed to the watertube boiler 110 without any further treatment. However, this variation has the potential of fouling and scaling the watertube boiler to a greater extent than when distillate post treatment is utilized.

The advantages of this system are the incorporation of the water tube boiler and a lower operating cost, due to lower fuel consumption, as compared to the MVC/OTSG FIG. 2 process.

The disadvantages of this system include:
1. Highest power consumption and highest electrical infrastructure requirements
2. High total cost compared to other options
3. Multiple types of MVC evaporators are required (pretreatment/blowdown and crystallizer) which complicates operation
4. TOC is all rejected to the pretreatment/blowdown and crystallizer MVCs which will likely cause foaming problems that will complicate operation and puts the MVC compressors at risk of damage
5. Pretreatment MVC evaporator distillate must be cooled prior to RO treatment and then reheated.

In summary, the prior art process designs in current use for treating heavy oilfield produced waters for high quality steam generation to be utilized in down-hole steam flooding applications is not entirely satisfactory due to:
1. physical chemical treatment processes are usually extensive, require high maintenance and operator interface, and generate large sludge and regeneration streams that need to be dealt with in accordance with strict environmental regulations,
2. large quantities required of expensive treatment chemicals that, in cases, need special safety/handling procedures,
3. reliance on low efficiency OTSGs to generate high quality steam at a recovery rate of 80%, water to steam and the associated steam separator and blowdown condensate handling systems,
4. inherent OTSG problems with insufficient tube wetting, high heat transfer rates, and tube plugging,
5. high power consumption requirements and electrical infrastructure due to the use of vapor compressors,
6. treating the entire produced water stream to meet requirements for ASME grade water that can be utilized in a commercial water tube boiler.

As water is becoming increasingly expensive to treat, or in short supply, or both, it would be desirable to simplify the treatment necessary to generate high quality, high pressure steam and reduce the costs. Finally, it would be clearly desirable to meet such increasingly difficult water treatment objectives with better system availability and longer run times than is commonly achieved today.

It is believed that no one heretofore has thought it feasible to operate a water tube boiler on deionized water coupled to an evaporator system at high pH and at pressures high enough to provide steam that can be directly used for steam flooding projects. The conventional engineering approach has been to design systems such as those depicted in the prior art FIGS. 1-3 or to limit the final concentrations to levels that do not cause scaling problems.

Therefore, a heretofore unaddressed need exists in the heavy oil industry to address the aforementioned deficiencies and inadequacies. Accordingly, it would be advantageous to address the drawbacks to current practice, which would help both the environment and assist the production facility ownership and operations area in controlling costs.

SUMMARY OF THE INVENTION

The present invention provides a novel high pressure steam generation method for produced water employing industrial high TDS brine concentration technology that eliminates the need for once through steam generators and power consuming vapor compressors.

In a unique process for producing high pressure steam vapor, de-oiled produced waters of low hardness and low non-hydroxide alkalinity are injected with a caustic solution to raise the pH prior to high pressure steam generation (HiPVap). In situations wherein scale causing non-hydroxide alkalinity is present in the produced water feed stream, an acid injection system is used to destroy the alkalinity prior to raising the pH for steam generation in the HiPVap.

The preferred design used in the present invention provides a produced water steam generation plant that overcomes a number of important and serious problems. First, the use of problem prone low efficiency once through steam generators for high pressure steam production is no longer required. Second, the pretreatment requirements of the produced water, prior to high pressure steam generation, are minimized or eliminated entirely. Sludge streams associated with warm lime softening are eliminated. Third, the process as disclosed herein, is completely steam driven and there is no requirement for high energy consuming mechanical vapor compressors or electrical infrastructure. Fourth, controlled levels of multivalent cations, combined with controlled levels of non-hydroxide alkalinity, substantially eliminates the precipitation of scale forming compounds associated with sulfate, carbonate, or silicate anions. Thus, cleaning requirements are minimized. This is important commercially because it enables a water treatment plant to avoid lost water production, which would otherwise undesirably require increased treatment plant size to accommodate for the lost production during cleaning cycles. Fifth, the preferred high pH operational conditions enable a high degree of ionization to be achieved in various species which are sparingly ionized at neutral or near neutral pH in aqueous solution, such as silica, to enable such species to be concentrated to higher levels before precipitation. Sixth, another benefit to HiPVap operation is the use of industry accepted water tube boilers, the feed to which is not organic laden makeup water. Finally, the HiPVap steam generation process has the benefits of a very high brine recirculation rate to evaporation rate ratio, which results in better heat transfer surface wetting, and a lower temperature difference combined with a lower heat transfer rate across the heat transfer surface than an OTSG operating on the same produced water. The result is a better design with less scaling potential and higher allowable concentration factors.

OBJECTS, ADVANTAGES, AND NOVEL FEATURES

A new process for producing high-pressure high quality steam from produced water disclosed herein, and various embodiments thereof, can be applied to the heavy oil industry. Such embodiments are particularly advantageous in that they consume less electrical power, minimize the generation of waste products, utilize waste heat, minimize maintenance, and are superior to current water treatment processes heretofore used in the recovery of oil from tar sands and other heavy oil operations.

From the abovementioned, it will be observed that one of the significant and major objectives resides in the provision of a novel process, including variations thereof, for the treatment of produced waters, so that such waters can be recovered and re-used in producing steam for use in heavy oil recovery operations.

Another important objective is to simplify process plant flow sheets by minimizing the number of unit processes required in water treatment trains, which simplifies operations and lowers costs in heavy oil recovery operations.

Other important, but more specific objectives reside in the provision of various embodiments of an improved water treatment process for production of high quality steam for downhole use in heavy oil recovery, which:

(a) eliminates the requirement for once through steam generators and separation of high pressure steam from residual hot condensates;

(b) eliminates the generation of softener sludges;

(c) reduces electrical power consumption by utilizing steam as the energy source instead of mechanical vapor compressors;

(d) minimizes operation and maintenance labor requirements;

(e) reduces the capital and operating costs of water treatment equipment; and (f) minimizes chemical additives and associated handling requirements.

Other important objects, features, and additional advantages of the invention will become apparent to those skilled in the art from the foregoing and from the appended claims, in conjunction with the detailed discussion below and the accompanying drawing.

BRIEF DESCRIPTION OF THE DRAWINGS

In the drawings:

For comparative purposes, all of the prior art examples shown herein incorporate the Zero Liquid Discharge (ZLD) concept as a part of the illustration although, in many current installations, waste disposal is accomplished by deep-well injection. Those skilled in the art will recognize that merely minimizing the blowdown stream without the use of a dewatering device may, on certain occasions, also qualify the system as ZLD. The high pressure, high efficiency evaporation method defined herein is site specific wherein individual process steps are customized to fit the specific feed water, and needs of the customer. For that reason, all possible embodiments of this novel method of water treatment are not illustrated and, as those skilled in the art can appreciate, other illustrative embodiments would merely reflect variations and rearrangement of some components without affecting the spirit or concept of this invention.

Figure 1:
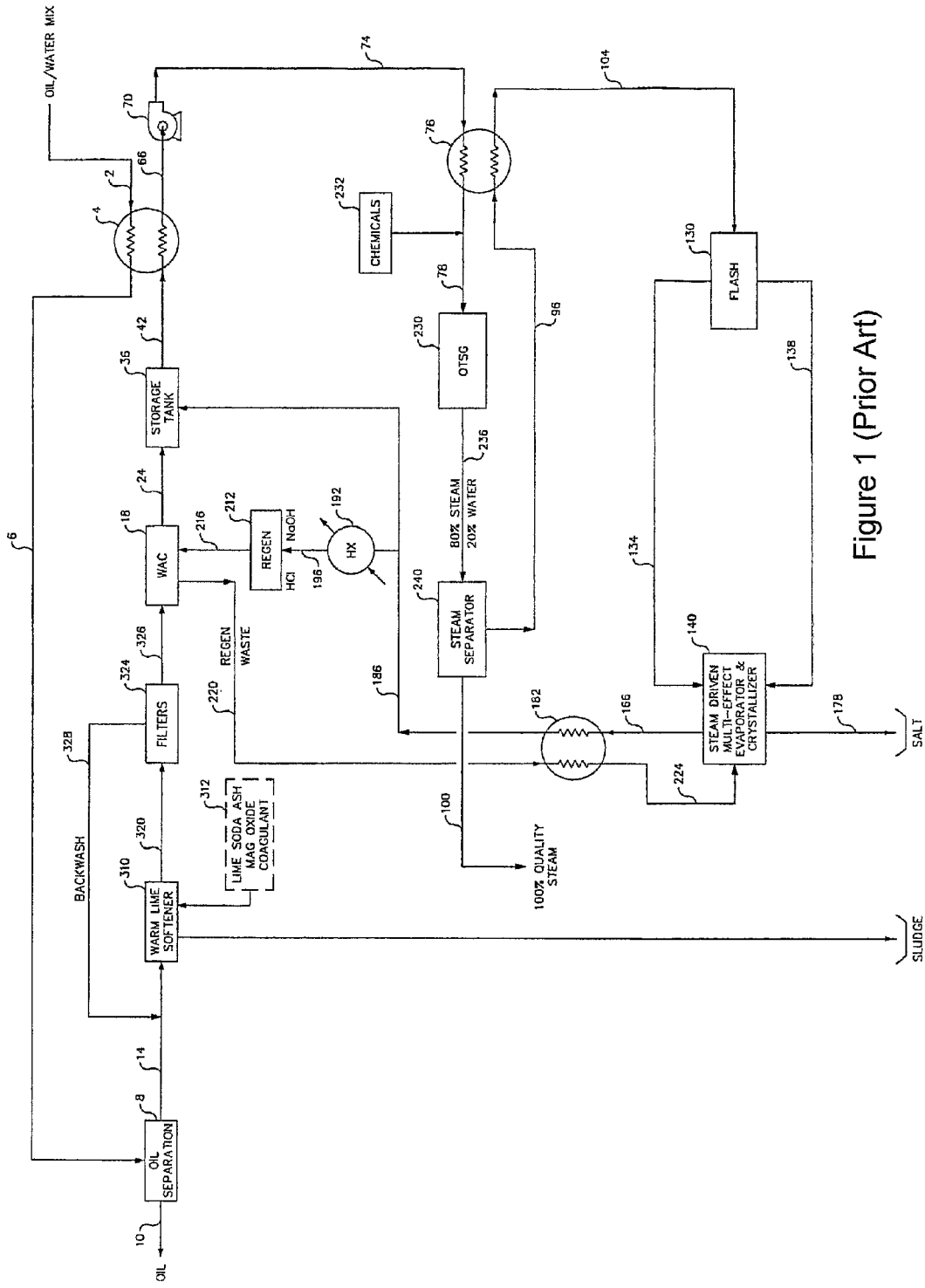

The same identifier will reference identical features depicted in each of the drawings.

BRIEF DESCRIPTION OF THE DRAWINGS

In the drawings:

FIG. 1 is a schematic diagram that shows a prior art process, specifically a generalized process flow diagram for one typical physical-chemical water treatment process used in steam assisted gravity drainage (SAGD) heavy oil recovery operations.

Figure 2:
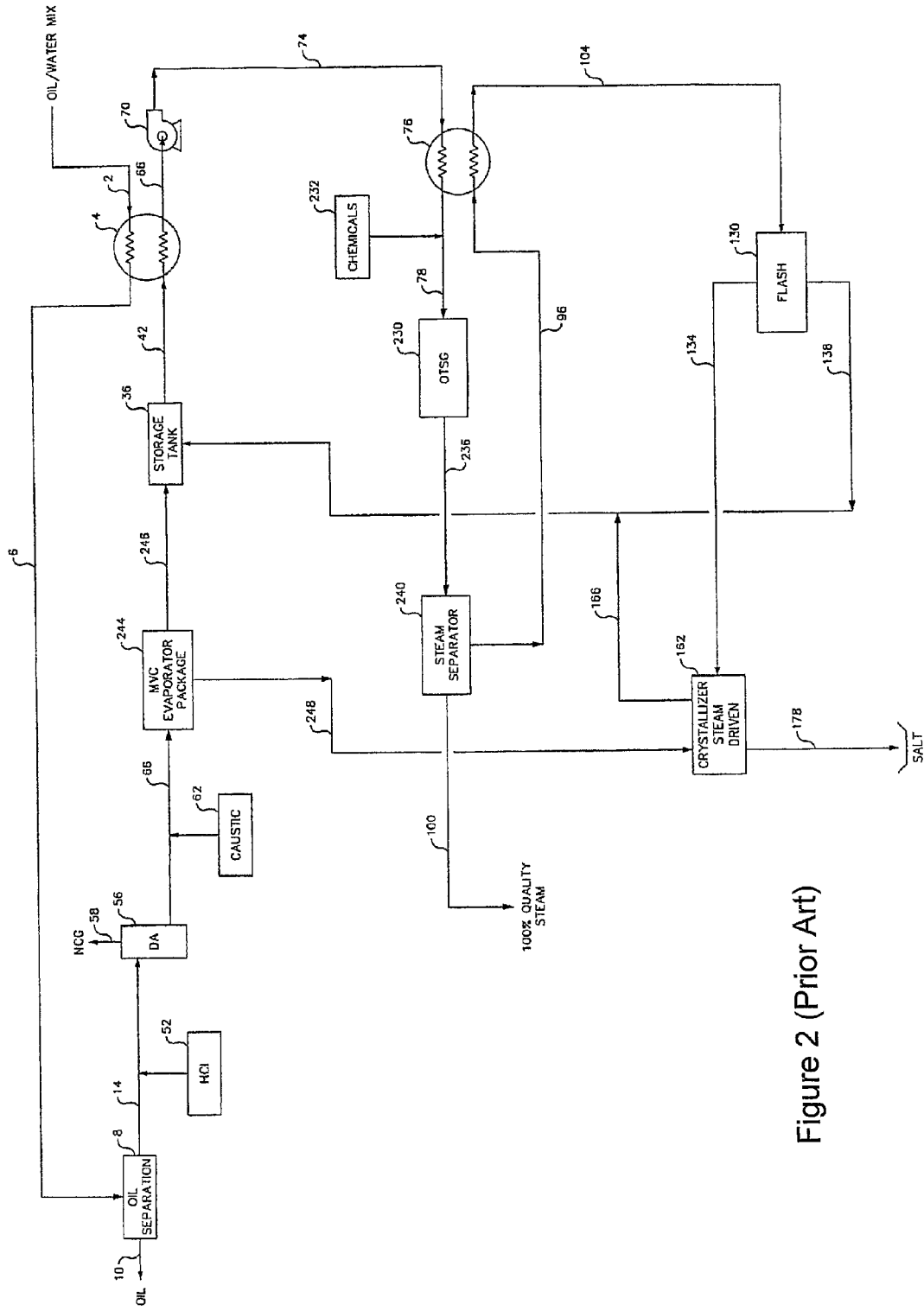

FIG. 2 is a schematic diagram that shows a prior art process, specifically a generalized process flow diagram wherein the physical-chemical water treatment method is replaced by a mechanical vapor compression (MVC) process to supply purified water to a once through steam generator (OTSG) used in steam assisted gravity drainage (SAGD) heavy oil recovery operations.

Figure 3:
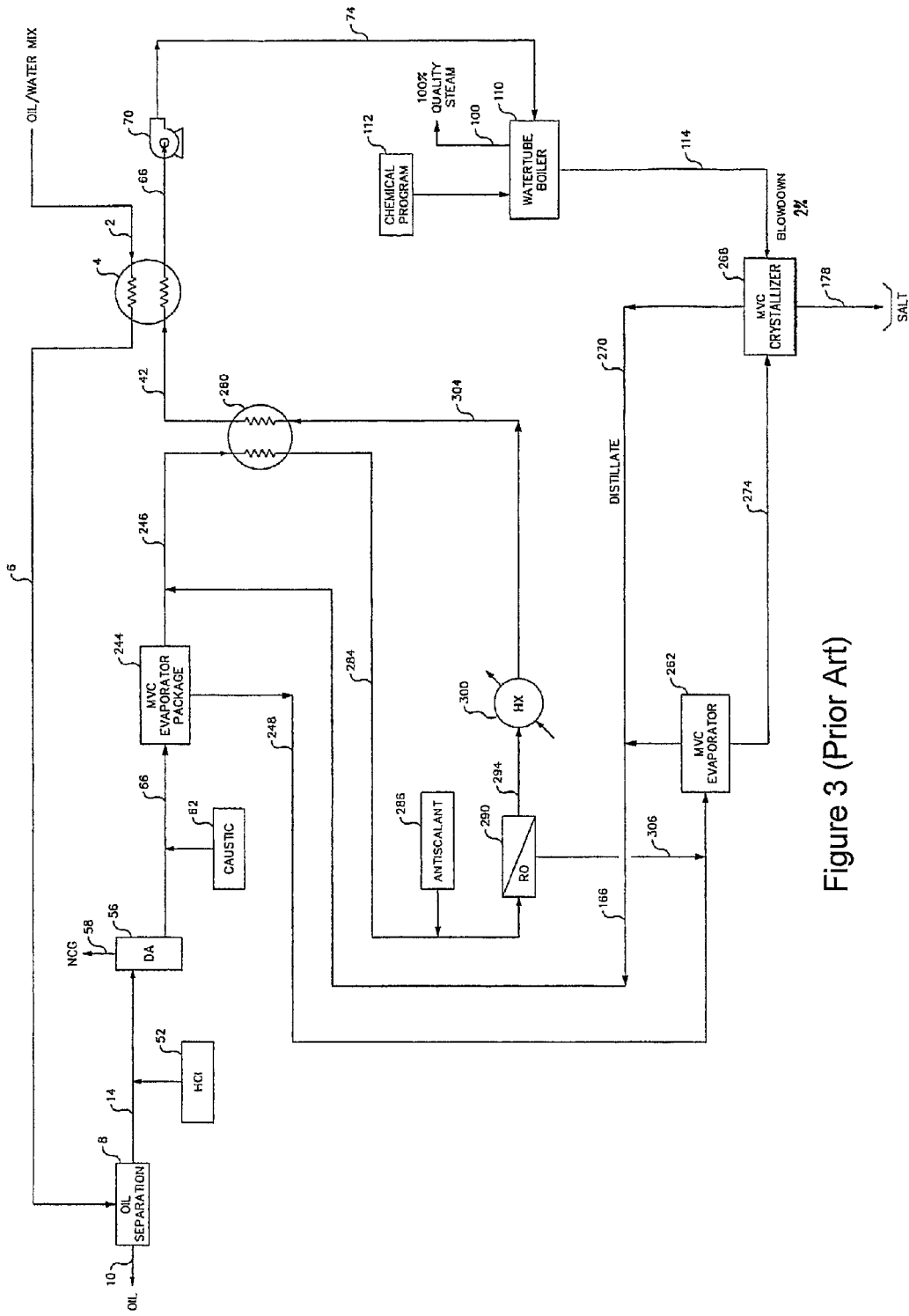

FIG. 3 is a schematic diagram that illustrates a prior art process in which the distillate from a mechanical vapor compression (MVC) method is further treated in reverse osmosis (RO) equipment that enables replacing a once through steam generator (OTSG) with a commercial packaged boiler in steam assisted gravity drainage (SAGD) heavy oil recovery operations.

Figure 4:
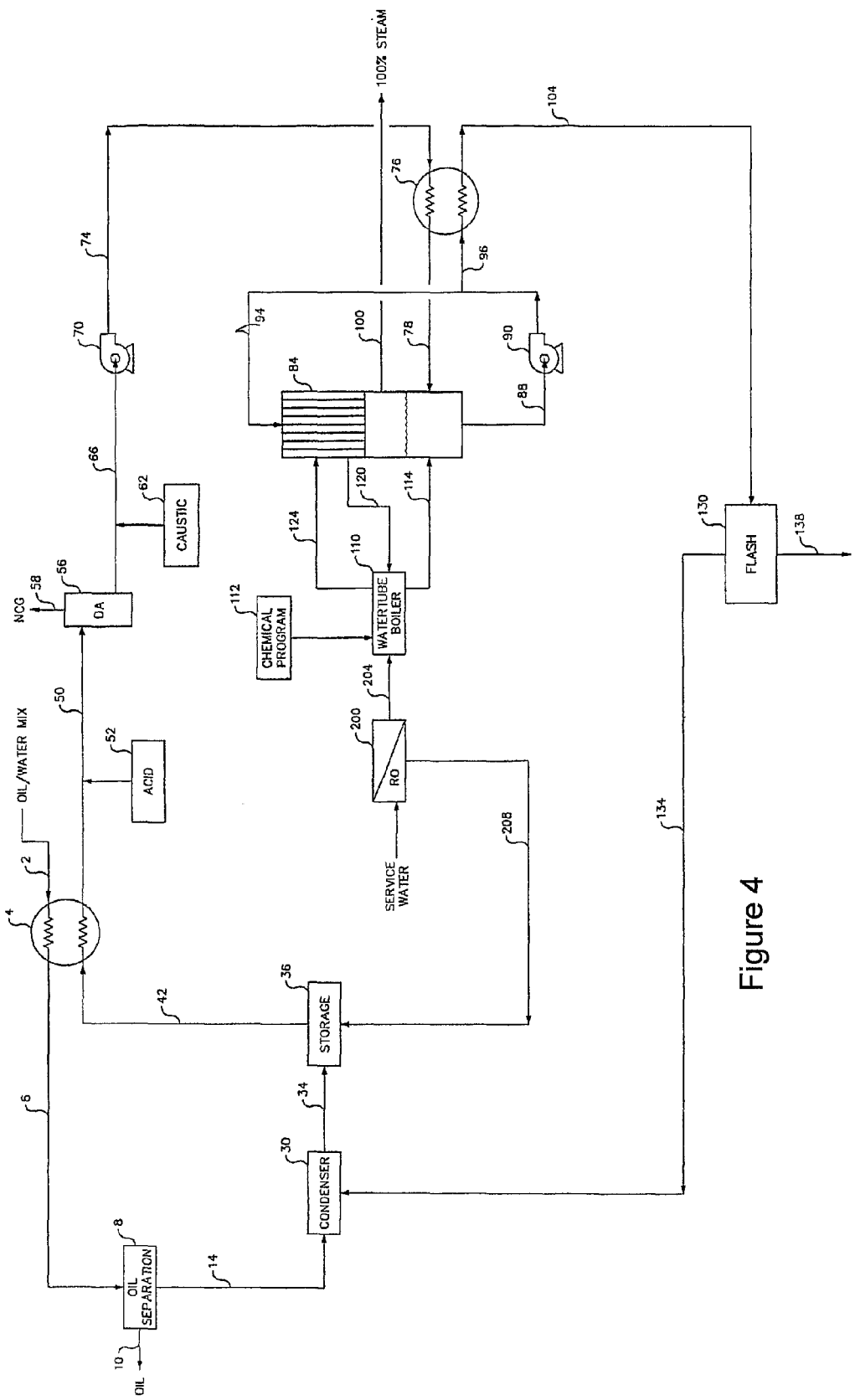

FIG. 4 is a schematic diagram that shows one embodiment of the novel steam generation process disclosed and claimed herein, illustrating the use of the process for high pressure steam production with produced waters low in hardness and alkalinity in steam assisted gravity drainage (SAGD) heavy oil recovery operations.

Figure 5:
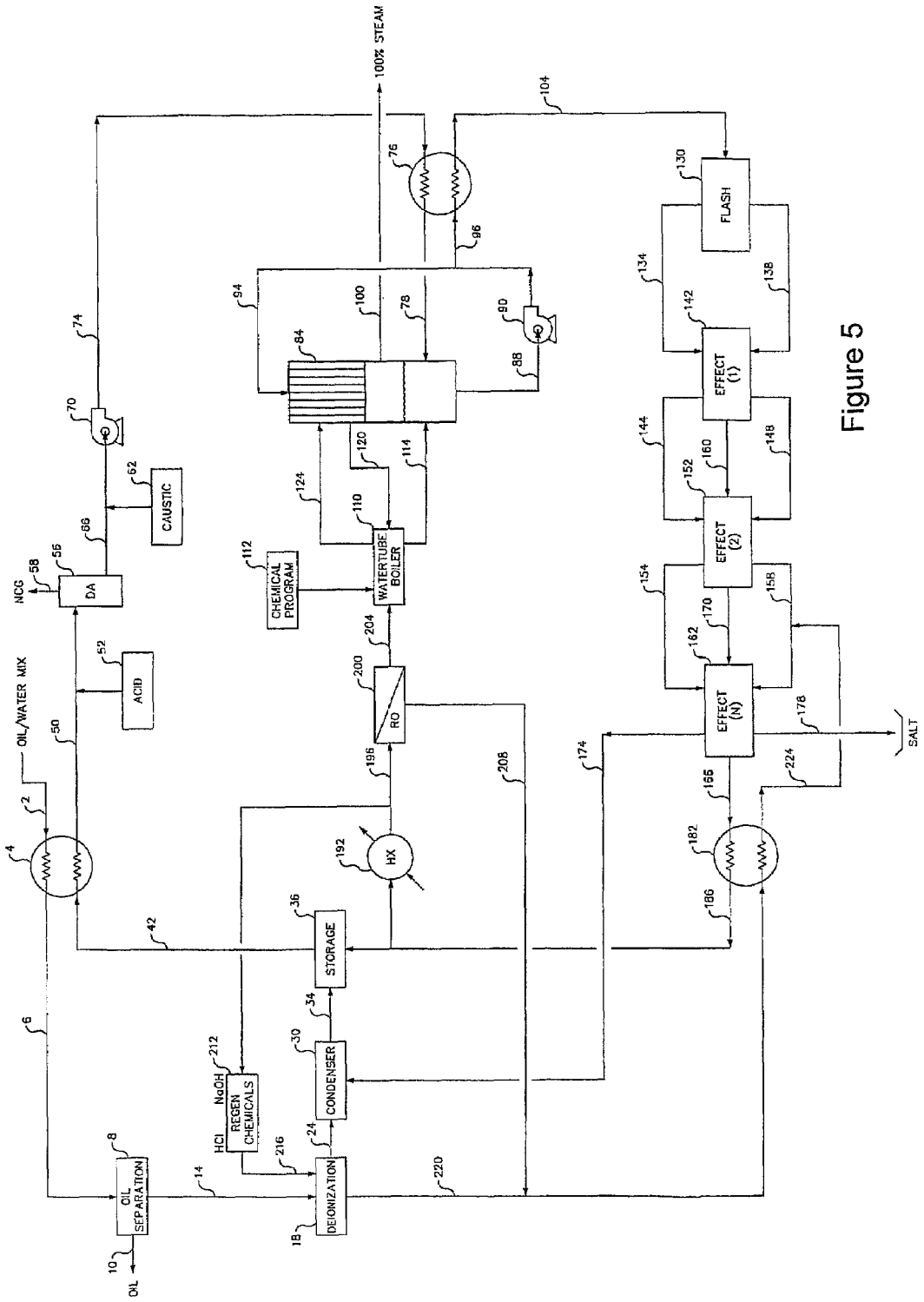

FIG. 5 is a schematic diagram that illustrates another embodiment of the novel steam generation process disclosed and claimed herein, illustrating the use of the HiPVap process on produced waters classified as high in hardness and carbonate alkalinity ions.

FIG. 6 is a table that shows the typical feedwater quality requirements for steam generators which produce steam in the 1000 pounds per square inch gauge (PSIG), or thereabouts, for once through steam generator installations.

FIG. 7 is a table that shows the typical feedwater quality requirements for watertube boilers which produce steam in the 1000 pounds per square inch gauge (PSIG), or thereabouts, for watertube boiler installations.

Figure 8:
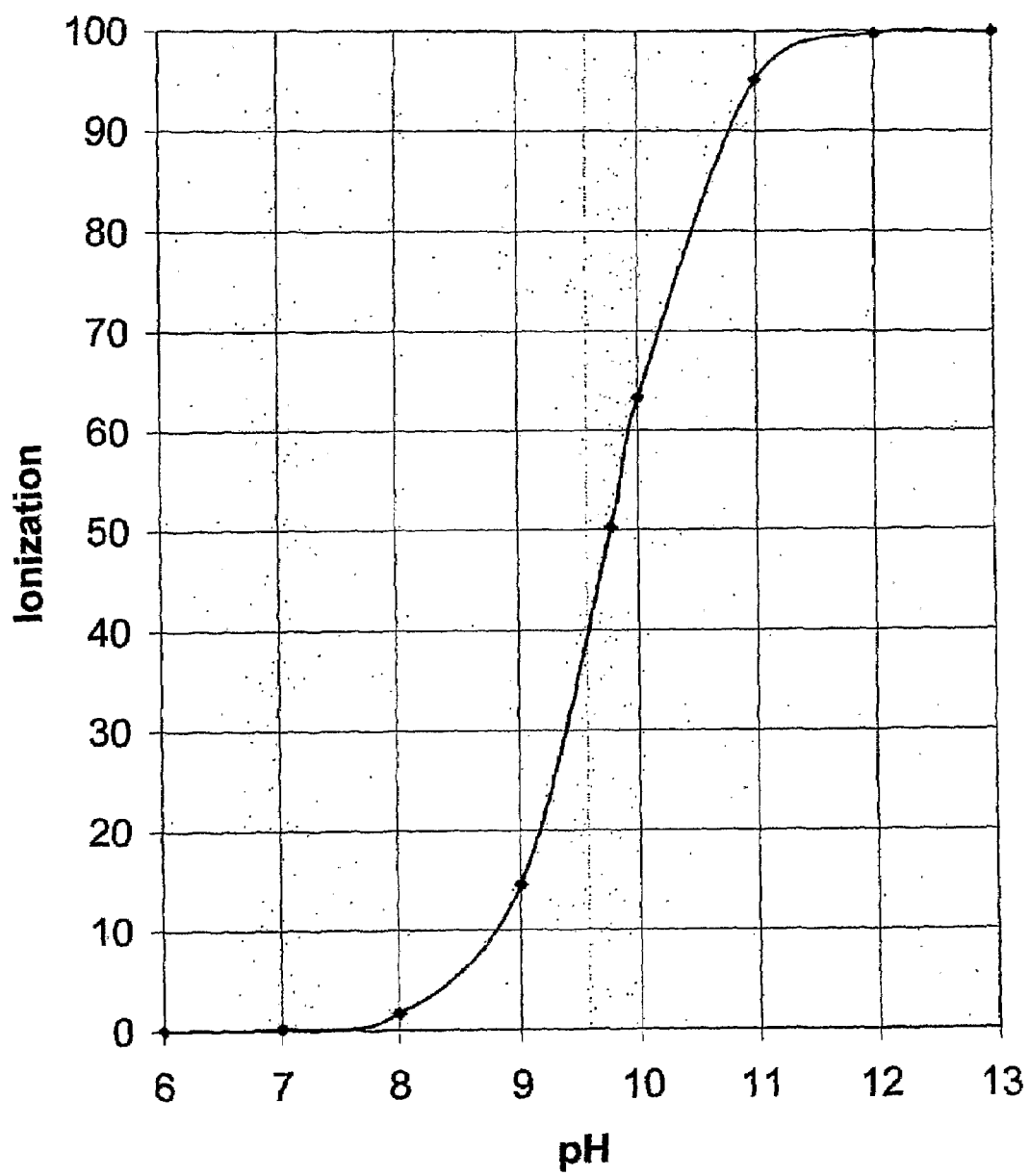

FIG. 8 is a graph that details the ionization of silica as a function of pH.

The foregoing figures, being merely exemplary, contain various elements that may be present or omitted from actual process implementations depending upon the circumstances. An attempt has been made to draw the figures in a way that illustrates at least those elements that are significant for an understanding of the various embodiments and aspects of the invention.

DETAILED DESCRIPTION OF THE INVENTION

Heavy oil recovery operations have increasingly incorporated the steam assisted gravity drainage (SAGD) method to recover oil from tar sand and other networks. In this method the injected steam is more efficiently utilized as 100% quality (i.e., no liquid water entrained with the steam) in contrast to older methods in which an 80% steam/20% water mixture was used for steam flooding of the oil field. However, the once through steam generators (OTSG) in standard use are designed to generate 80% quality steam which then requires the use of steam separators to remove the entrained water portion to provide 100% quality steam for down-hole injection. The use of an OTSG to supply the 100% quality steam required for steam flooding leaves the high pressure high temperature liquid portion that needs to be handled and disposed of. In some cases it can be utilized for other steam consumers by using a sequential arrangement of flash tanks, each providing a lower pressure steam, but ultimately resulting in a liquid stream that had to be disposed of.

Heavy oil recovery operators are now looking at commercial water tube boilers to generate the 100% steam quality required. This became the desired next step since water tube boilers are designed to provide high purity steam at the pressures required for steam flooding, whereas the installation, operating, and maintenance expenses are lower than OTSGs, and the high efficiency of the water tube boiler results in a small blowdown stream that requires disposal. However, the use of a water tube boiler required a more extensive water pretreatment process as the feedwater requirements are much stricter than for an OTSG. Refer to FIG. 6 and FIG. 7 for a comparison of the feedwater characteristics required for the water tube boiler installation in comparison to the OTSG. The industry recognizes that the only way to achieve the water quality required for water tube boilers is to remove the dissolved solutes and TOC (Total Organic Carbon) present in produced waters. This level of pre-treatment requires membrane separation and/or evaporative process. Cooling and subsequent reheating of the produced water are required for membrane systems due to their temperature limitations. Also, the evaporation processes that have been considered (reference FIGS. 2 and 3) are energy intensive.

The invention disclosed herein provides a novel integrated process for generating high pressure steam from produced water. The energy that would normally only be used once to generate injection steam is used twice in this process. The first use of the energy is the generation of steam from high purity water in a water tube boiler. The second use is the generation of injection steam from produced water. The generation of injection steam from produced water is accomplished by utilizing a high pressure, high efficiency HiPVap process. This overcomes the disadvantages of the low efficiency OTSG, the requirements for treating the full produced water feed stream to ASME quality standards for water tube boilers, and high power consumption by the MVC installations. When incorporated with the zero liquid discharge (ZLD) in one embodiment, recoveries greater than 98% of the produced water feed stream are attainable at a cost effective price with no liquid streams requiring disposal.

Present day state of the art steam generation, either OTSG or watertube boiler, is limited on how much water can be recovered by scale causing ions, such as hardness and silica, which are inherent in these waste streams, total organic carbon (TOC), and maximum total dissolved solids (TDS) allowable in the feed stream. The additions of expensive scale inhibiting agents or scale control methods are beneficial but still have their limits of usefulness. Evaporators that are used as industrial brine concentrators overcome the TDS limitations with their built in high solids capability and heat transfer surface wetting design. They can also handle high TOC loadings but volatile TOC carries over with the generated vapor which, when condensed, passes into any downstream users of the distillate produced causing scaling and/or fouling problems.

The present invention provides a novel process to overcome these limitations and recover more of the produced water for steam generation than was previously possible by providing a high pH scale free environment in a high pressure, high efficiency HiPVap process that incorporates the high solutes capability of industrial brine concentrators. Volatile TOC does not present a problem as it is carried out with the high pressure steam vapor and sent to the borehole for steam injection. In addition, the HiPVap process does not require any additional energy to produce high pressure injection steam, as compared to conventional OTSG systems, and uses significantly less energy than the current MVC evaporative technologies.

Although it may seem impractical to use steam to generate steam, the practice has positive benefits when applied as disclosed herein. Of prime importance is the fact that both the industrial high pressure evaporator and the watertube boiler are being operated in the environments that they were originally designed for; i.e. a high TDS brine concentrating evaporator coupled with a high pressure high purity ASME grade watertube boiler. This leads to equipment reliability and reduced costs. The cost reductions can be broken down into lower operating costs, since there is no requirement for mechanical vapor compressors, and lower water pretreatment capital costs, since there is not a requirement for extensive water conditioning associated with changing a produced water into ASME quality water.

Attributes that characterize the high pressure, high efficiency evaporator (HiPVap) process design and operation are:

Generation of high quality steam at pressures ranging from 200 to 1600 psig without the use of a low efficiency once through steam generator (OTSG).

The ratio of evaporation to recirculation of produced water inside the HiPVap unit is very low, thus the heat transfer surface stays very well wetted and scaling potential along with dry spots is minimized.

Lower power consumption and lower electrical infrastructure costs as electrically driven steam vapor compressors are not required.

Time proven conservative industrial design for the evaporation of high TDS streams with high organic levels.

Elimination of lime softening waste streams which are difficult to handle in cold climates.

Simplified pretreatment process for de-oiled produced water prior to steam generation.

Very high solubility of weak acid anions such as silica when operating at a high pH.

Very high achievable concentration factors (recovery—ninety percent (90%) or higher recovery can be achieved).

Cleaning frequency is substantially reduced.

Addition of scale inhibitors is virtually eliminated.

Corrosion potential is reduced by operation at high pH thus allowing the use of low cost materials of construction.

Reduced overall operating cost, compared to conventional produced water recovery and steam generation systems.

Reduced overall capital cost, compared to conventional produced water recovery and steam generation systems.

The HiPVap process is site-specific. Individual process steps are customized to fit the particular produced water at a given site. Regardless of the difference in the pretreatment process for different sites, one process parameter is common for all applications, namely that the HiPVap system is operated at the highest feasible blowdown pH. This factor enables the circulating solution to provide a low corrosion potential, high silica tolerant, and non-fouling organic environment at the heat transfer surface.

With reference to the various figures, produced water feed stream 14 will typically contain soluble and insoluble, organic and inorganic components. The inorganic components can be salts such as sodium chloride, sodium sulfate, calcium chloride, calcium carbonate, calcium phosphate, barium chloride, barium sulfate, and other like compounds. Metals such as copper, nickel, lead, zinc, arsenic, iron, cobalt, cadmium, strontium, magnesium, boron, chromium, and the like may also be included. Organic components are typically dissolved and emulsified hydrocarbons such as benzene, toluene, phenol, and the like.

Produced waters utilized for production of steam additionally include the presence of silicon dioxide (also known as silica or $SiO_2$) in one form or another, depending upon pH and the other species present in the water. For evaporator systems, scaling of the heat transfer surface with silica is to be avoided. This is because (a) silica forms a relatively hard scale that reduces productivity of the evaporator, (b) it is usually rather difficult to remove, (c) the scale removal process produces undesirable quantities of spent cleaning chemicals, and (d) cleaning cycles result in undesirable and unproductive off-line periods for the equipment. Therefore, regardless of the level of silica in the incoming raw feed water, operation of conventional evaporation processes, without a scale control method such as preferential deposition seeded slurry, generally involves concentration of $SiO_2$ in the high solids stream to a level not appreciably in excess of 150 ppm of silica (as $SiO_2$). This requires that evaporator systems be operated at lowered concentration factors (recovery rates) to prevent silica concentration in the blowdown stream from exceeding solubility limits. Seeded slurry systems can be taken to concentration factors that surpass the solubility of silica but rely on seed management procedures and are still prone to scaling of the evaporator heat transfer surfaces.

It is commonly understood that the solubility of silica increases with increasing pH, and that silica is quite soluble in high pH aqueous solution. The increase in silica solubility is basically proportional to the change in ionization as increased ionization results in the soluble silicate ion being the dominant species. The solubility is not directly proportional because even un-dissociated silica exhibits some solubility in aqueous solutions, typically up to about one hundred twenty (120) ppm to one hundred sixty (160) ppm, depending upon temperature and other factors. In comparison, it has been demonstrated that silica solubility at pH 11 is in excess of one thousand five hundred (1,500) ppm at ambient temperature; silica is increasingly soluble as temperature and/or pH increases.

Silica is very weakly ionized when in neutral or near neutral aqueous solutions and is generally considered to exist as un-dissociated (meta/ortho-) silicic acid ($H_4 SiO_4$) in most naturally occurring waters with a pH of up to about 8. The dissociation constant (pKa) value for the first stage of dissociation of silica has been reported at approximately 9.7, which indicates that silica is approximately fifty percent (50%) ionized at a pH of 9.7; the other fifty percent (50%) remains as un-dissociated (ortho) silicic acid at that pH. A graphical representation of the relationship between pH and the percent silica ionization is shown in FIG. 8. Clearly, it would be advantageous, where silica ionization is desired, to operate at a pH in excess of 10, and more preferably, in excess of 11, and yet more preferably, in excess of 12 where the entire silica molecule is present as a soluble silicate ion.

Therefore, increasing the pH of the HiPVap process thus provides the major benefit of increased silica solubility. To gain maximum benefit from silica ionization at high pH, the HiPVap system should be operated at a pH as high as possible. Preferably, the evaporator system is operated at a pH of about 10.5 or above, and more preferably, at a pH of 11 or higher.

By maintaining hardness and non-hydroxide alkalinity at levels which effectively avoid formation of scale at a selected pH for HiPVap process, the concentration of $SiO_2$ in the HiPVap blowdown stream can be safely increased to at least 5500 ppm, or more. This is accomplished by raising the pH of the produced water fed to the HiPVap system and without the use of silica scale inhibition chemicals or control methods.

The novel process disclosed herein is situated between the oil separation zone, 8 in the various figures, and the steam injection well used for steam flooding in oil recovery installations. The separated and de-oiled produced water 14, typically with 10 to 20 ppm residual oil, is analyzed for calcium carbonate scale forming potential by use of scale indexes such as the Langelier Saturation Index, the Stiff-Davis Index, and other solubility tables. These indexes, as is known to those with ordinary skill in the art and to whom this specification is directed, take as input the calcium, magnesium, alkalinity, pH, and temperature of operation to determine what amount, if any, of the scale causing ions present in the produced water must be reduced for scale free operation. Other tables, based on calcium sulfate and silica, are also used to determine the solubility levels and concentration factors attainable with these compounds in the produced water stream. After determining the scaling potential of the produced water, an embodiment of this novel process is chosen that will ensure scale free operation at the concentration factor required.

Referring to FIG. 4 or FIG. 5, following any produced water conditioning, as determined by the appropriate indexes and solubility charts, the herein disclosed novel high pressure, high efficiency HiPVap 84 must be operated in such a manner that the pH of the blowdown is approximately, but preferably not higher than, 12.5. The selected pH is based on the amount of silica in the produced water feed stream along with the concentration factor required and may be lower, but not lower than 10.5, depending on site specific design conditions.

FIG. 4 represents the HiPVap process as it would be incorporated into a SAGD application with typical produced water containing low hardness and low alkalinity solutes. The necessary pretreatment and conditioning prior to the HiPVap process is accomplished by the addition of acid 52, such as sulfuric or hydrochloric, when necessary and or appropriate, to lower the pH sufficiently to convert bound carbonate alkalinity to gaseous carbon dioxide. The carbon dioxide along with other non-condensable gasses (NCG) such as oxygen and nitrogen are then removed in the HiPVap deaerator 56. Following the deaerator 56, the produced water feed stream is then conditioned by the addition of caustic 62, such as sodium hydroxide or potassium hydroxide, to a pre-selected pH prior to the HiPVap 84 process.

In the HiPVap 84, the treated and conditioned produced water 78 mixes with and dilutes the concentrated high solids stream present in line 88. This stream is recirculated with high pressure recirculation pump 90 and a small portion is removed as HiPVap blowdown through line 96 on each pass through the HiPVap 84. The solutes in the produced feed water are concentrated in HiPVap 84 by removing water from the diluted recirculating solution in line 94 as it passes over the heat transfer surface. As depicted in FIG. 4, the HiPVap utilizes falling thin film evaporation wherein the recirculated stream depicted by line 94 is thinly spread across the inner, or first, surface of a plurality of heat transfer tubes. A small portion of water is removed from the thin recirculating stream in the form of steam vapor driven by the high pressure steam in line 124 which is condensing on the outside of the heat transfer tubes. The water that has been removed, in the form of high temperature steam at the high pressures necessary for injection, and typically with less than 10 ppm (parts per million) of non-volatile solutes, is routed through line 100 directly to the steam injection well.

A commercial watertube boiler 110 operating on high quality ASME rated feed water supplies the high pressure steam, through line 124, that is required to drive the high pressure high efficiency HiPVap 84 wherein the high pressure steam transfers heat by condensing on the second surface of said plurality of heat transfer surfaces. The condensing steam descends by gravity to the bottom of the tubular heat transfer surface and is collected as condensate stream 120 and then returned to the commercial watertube boiler 110 wherein energy is supplied and the condensate is returned to its steam form to keep the evaporation process going.

A small boiler blowdown stream represented by line 114 is taken from the watertube boiler 110, and directed to the HiPVap 84 for recovery. The blowdown stream 114 is necessary to prevent buildup up of total dissolved solids (TDS) in the boiler due to venting and ensuing makeup water requirement and is typically less than 2% of the boiler capacity.

Makeup water for the watertube boiler 110 can be supplied by any of various means of producing deionized water. As depicted in FIG. 4, the makeup is supplied through line 204 by a small, high recovery, typically greater than 90%, reverse osmosis (RO) unit 200 that operates on good quality service or well water. Under these circumstances, the RO unit 200 provides high quality ASME grade permeate, which along with the industry standard conventional high pressure boiler chemical program 112, ensures trouble free operation of the watertube boiler 110. In other embodiments, the RO unit 200 can be replaced with an ion exchange column, of various types, to provide the ASME quality water required by watertube boiler 110.

The just described novel HiPVap process produces a high quality steam at pressures dependent on the individual site designs, typically ranging from 200 to 1600 psig, which satisfies the 100% quality steam requirement needed for SAGD operation at a cost reduction when compared to OTSG and MVC processes. Ideally, and as depicted in FIGS. 4 and 5, only one stream, HiPVap blowdown 96 needs to be handled. The blowdown, as represented by line 96, from the HiPVap, 84, can be disposed of by what is known as deep well injection, after flashing 130 to atmospheric pressure, in areas where it is permissible and/or possible, off-site waste disposal facilities, or preferentially by a zero liquid discharge (ZLD) system. The flashed steam 134 is then sent to the condenser 30 for recovery.

DESCRIPTION OF AN EMBODIMENT WITH ZLD

Referring to FIG. 5, an alternate embodiment of the present invention for the high pressure high efficiency HiPVap process on produced water is shown. It is a flow diagram for produced water that has been recovered from a steam flood process in which the amount of hardness and carbonate alkalinity are high enough that pre-conditioning is required to lower them to acceptable quantities for HiPVap operation. The zero liquid discharge (ZLD) concept is also illustrated in order to further understand the breadth of the process.

The production stream 2 coming from the well head containing a mixture of oil and water (e.g., 75% water and 25% oil), at a typical temperature of around 330° F., flows to the oil separation zone 8 after passing through the produced water pre-heater 4. After substantially all oil has been removed, typically to a residual content of 10-20 ppm by means as discussed previously, the produced water, now at a temperature around 190° F., flows via line 14 to the deionization zone 18 which incorporates weak acid cation (WAC) resins operating in the sodium form. In the WAC the calcium and magnesium cations are reduced to non-scaling levels by replacing them with sodium ions.

After calcium and magnesium removal in the deionization zone 18, the now softened produced water 24 flows to a direct contact condenser 30. In condenser 30, the produced water mixes with and condenses the steam vapor from the crystallizing effect 162 of the multiple effect ZLD system.

After the condenser 30, the mixed stream 34 is transferred to buffer storage tank 36 where distillate 186 from the ZLD system is added.

The outlet 42 from buffer storage tank 36, now at a temperature of about 205° F. is pressurized to suppress boiling and routed via line 42 through produced water pre-heater 4, which adds about 100° F. to the stream, and then to degasifier 56 through conduit 50. Acid 52 is added, as appropriate and as determined necessary by the different scaling indexes, to the effluent 50 from produced water pre-heater 4 to enhance non-hydroxide alkalinity destruction. Sufficient acid is added to lower the pH where bound carbonates are converted to a free gas carbon dioxide. Then, the carbon dioxide that has been created by acid addition is removed, along with other non-condensable gasses (NCG) 58 such as oxygen and nitrogen, preferably in a flash type degasifier 56 although a forced draft type degasifier could also be utilized.

Preferably, either hydrochloric (HCl) or sulfuric ($H_2SO_4$) acid is used for lowering the pH although other acids will also work. In other embodiments, wherein the different scaling indexes indicate that alkalinity removal is not required for scale free operation at elevated pH, the acid addition 52 and degasifier 56 are not utilized.

One precaution that should be observed is that both hardness and non-hydroxide forms of alkalinity should be at non-scaling levels in the produced water prior to upward pH adjustment for selected HiPVap operating conditions. Once these conditions are met, then the desired pH increase may be accomplished with any convenient caustic source, such as sodium hydroxide (NaOH) or potassium hydroxide (KOH). Once this pretreatment has been thoroughly accomplished, then a HiPVap system can be safely operated at very high pH levels, in order to take advantage of the aforementioned silica solubility and corrosion resistance.

The treated and conditioned produced water is pressurized to the selected operating pressure with high pressure pump 70, typically 1000 psig, or greater, and directed to the high pressure high efficiency steam generator (HiPVap) 84 through blowdown heat exchanger 76. A caustic 62 (base) is added, preferably by pumped injection of liquid solution, to increase the pH of the produced feed water 66 to a preselected level. The pH of the produced water is raised to a selected pH of at least about 10.0, or preferably to a range between 10 and 11, or otherwise in excess of 11, and most preferably to 12 or more and is maintained, at the selected operating level, in the HiPVap process.

The HiPVap 84 and water tube boiler 110 operations have been described in detail above and will not be repeated again since there are no changes in the process itself, even with the other embodiments incorporated described here.

Makeup water for the watertube boiler 110 is supplied through line 204 by a small, high recovery, typically greater than 90%, reverse osmosis (RO) unit 200 that operates on high quality distillate from the multiple-effect ZLD system. Under these circumstances, the RO unit 200 provides high quality ASME grade permeate, which along with the industry standard conventional high pressure boiler chemical program 112, ensures trouble free operation of the water tube boiler 110. The reject stream from the RO unit 200 is routed via line 208 to the crystallizer effect 162 of the ZLD system.

The high pressure high efficiency HiPVap blowdown represented by line 96 is directed through blowdown heat exchanger 76 where it gives up heat to the incoming produced water feed in line 74. The cooled blowdown in line 104, at a typical temperature of 500° F. and at ninety percent (90%) or less of the incoming produced water flow, containing the concentrated solutes originally present in the produced water 14 along with any chemicals used to lower and raise the pH can be disposed of by the standard approach used at individual sites. This includes flashing to recover lower temperature steam for other purposes and then holding the liquid portion on-site in waste evaporation ponds, trucking to a waste site, or injection into deep wells.

In the preferred embodiment as described herein, the blowdown stream depicted as line 104 is directed to the multiple-effect ZLD system as shown in FIG. 5 wherein increased recovery is accomplished. The first step in the ZLD process involves flashing the blowdown 104 to a lower pressure in flash tank 130. The flash tank 130 separates the HiPVap liquid blowdown 104 into a lower temperature steam line 134 and liquid stream 138 which are routed to Effect (1) 142 which constitutes a primary concentrator evaporator. Effect (1) 142 is the first effect of effects (1), effect (2), etc, through effect (N) (wherein N is a positive integer equal to the number of effects) to successively recover a series of lower pressure steam flows which are utilized to drive evaporation in the succeeding effect. The first effects of the ZLD process gradually concentrate the blowdown from evaporator 84 prior to solute crystallization in effect (N) 162. The concentration effects 1, 2, etc. may be falling film or rising film type evaporators while the N effect, or crystallizer, is typically of the forced circulation type.

The solutes in the recirculated blowdown stream, as represented by line 138, are concentrated by removing water from the recirculating solution as it passes over the heat transfer surface in effect 142. As depicted in FIG. 5, the evaporator utilizes falling thin film evaporation wherein the recirculated stream depicted by line 138 is thinly spread across the inner surface of a plurality of heat transfer tubes. A small portion of water is removed from the thin recirculating stream in the form of steam vapor driven by the flashed steam in line 134 which is transferring heat by condensing on the outside of the heat transfer tubes. The condensing steam descends by gravity to the bottom of the tubular heat transfer surface and is collected as condensate stream 160.

The condensate stream 160 is routed through effect (2) 152 where it is combined with the distillate 170 from effect (2) 152 and then through effect (N) 162. The combined distillate/condensate 166 from all effects is then routed to the distillate heat exchanger 182 and then to storage 36 via line 186.

The steam vapor produced in effect (1) 142 is collected and directed to effect (2) 152 via line 144 to provide the driving force for evaporation. Line 148 represents the concentrated blowdown from effect (1) 142 which is recirculated across the heat transfer surface in effect (2) 152 as was described for the preceding effect. The steam vapor 154 generated is routed to effect (N) 162 where it condenses and heats the recirculating solution in a forced circulation heat exchanger. The blowdown from effect (2) 158 is recirculated through the heat exchanger in effect (N) 162 and then flashed into a chamber where the highly concentrated solutes precipitate out of solution.

Line 178 represents the concentrated blowdown from effect (N) 162 containing precipitated solids that can then be disposed of either by sending it to an on-site waste holding area for disposal or preferably in a solids dewatering device. Typical dewatering equipment consists of various type filter presses or centrifuges in which the suspended solids are removed from the mixed solution by filtration or centrifugal forces. The dewatered solids can then be trucked off either for disposal in a landfill site or, in some cases, sold for their value as inorganic salts. The filtrate is then sent back to the crystallizing effect (N) for further processing. In other installations, as applicable, the blowdown 178 is sent to a spray dryer and any water is removed from the mixed solution by the application of heat resulting in nothing left but salts of various types.

The vapor produced in the crystallizer effect (N) 162 is routed via conduit 174 to condenser 30 wherein it makes direct contact with the incoming de-oiled produced water 14 prior to storage buffer tank 36.

The final step in our novel process includes taking a portion of low solute condensate and distillate stream 186 for use as RO feed 196 after passing through heat exchanger 192. The high quality RO feed 196, which does not have any volatile organics, allows the RO unit 200 to produce ASME quality permeate water for feed to the watertube boiler 110.

It should be noted that the use of a tubular falling film evaporator design for equipment 84, 142, and 152 is provided only for purposes of enabling one skilled into this art to understand the evaporation process and is not intended to limit the process to the use of the same. Those familiar with the art will recognize that other designs, such as, for example, a rising film evaporator, or a natural, mechanical, or forced circulation evaporator, may be alternately utilized with the accompanying benefits and/or drawbacks that may be inherent in the alternative designs.

In other embodiments, and as suited to meet the particularized needs of a selected produced water chemistry, various forms of hardness removal may be utilized as long as the requirements for a resulting scale free environment in the HiPVap are met. These include a sodium form strong acid cation (SAC) exchange or a partial hardness removal utilizing a SAC exchange process followed by a polishing sodium form WAC or SAC. The benefit gained by SAC exchange is the use of sodium chloride (NaCl) as a regenerant as compared to the two-step sodium form WAC process which requires the use of acid and caustic to effect regeneration to the desired sodium form. Drawbacks of the SAC process are lower efficiencies wherein excess sodium chloride is required for regeneration resulting in a 10% to 15% increase over a WAC process, waste stream quantity for disposal, and hardness removal limitations in applications with TDS in excess of about 3000 ppm. However, there are applications where ease of use and relatively cheap cost of sodium chloride makes the SAC process a better choice than a WAC process as long as the effluent meets the scale free environment requirements for the HiPVap process.

In yet another embodiment, produced water 14 is first treated in a weak acid cation (WAC) ion exchange unit, operated in the hydrogen form where hardness and bicarbonate alkalinity are simultaneously removed. For those cases where produced water 14 hardness is greater than alkalinity, operation of the weak acid cation ion exchange unit must be facilitated by addition of a source of alkalinity, such as by addition of an aqueous solution of sodium carbonate ($Na_2CO_3$).

Regeneration of the resin is accomplished by use of conveniently available and cost effective acid. It is well known by those in the art that regeneration of WAC ion-exchange resins may proceed quite efficiently, at near stoichiometric levels (generally, not more than about one hundred and twenty percent (120%) of ideal levels). Preferably, hydrochloric acid may be used, since in such cases highly soluble calcium chloride would be produced, and the regeneration process would not pose the potential danger of formation of insoluble sulfate precipitates, such as calcium sulfate, even with high strength acids. However, by use of a staged regeneration procedure, i.e., by using a low concentration acid followed by a higher concentration acid, it is possible to reliably utilize other acids, including sulfuric acid ($H_2SO_4$), while still avoiding undesirable precipitates on the resin. In this manner, hardness ions are solubilized to form soluble salts, which are then eluted from the resin bed.

Economics of HiPVap Steam Generation

An economic analysis of the prior art systems in comparison to a preferred embodiment (FIG. 5) of the novel process disclosed herein was undertaken to further demonstrate the reduced costs that can be realized in the generation of high pressure steam. The study included the four systems as detailed in FIGS. 1, 2, 3, and 5 along with the following process assumptions for all cases.

Inlet Water Analysis, as mg/l $CaCO_3$, except pH and where noted:

| | | | |
|---|---|---|---|
| Calcium (Ca) | 13 | Bicarbonate ($HCO_3$) | 188 |
| Magnesium (Mg) | 5 | Carbonate ($CO_3$) | 0.3 |
| Sodium (Na) | 1579 | Sulfate ($SO_4$) | 0.3 |
| Potassium (K) | 0.51 | Chloride (Cl) | 1410 |
| Silica ($SiO_2$) | 180 | Iron (Total as mg/l ion) | 1.1 |
| TDS | 2179 as mg/l ion | Temperature | 80° C. |
| pH | 7.3 | Flow Rate | 3750 GPM |
| Oil | 10-20 mg/l | | |

Assumptions:

Produced water from the recovery well is available at 164° C. for use within the different processes for heat exchange purposes.

All systems are zero liquid discharge (ZLD).

A once through steam generator (OTSG) has a water to steam conversion ratio of 80%.

Watertube boilers operate with a 2% blowdown rate.

Operating Cost Assumptions:

The cost of lime and magnesium oxide is the same.

The OTSGs and water tube boilers operate at the same efficiency for conversion of fuel absorbed heat. The fuel consumption, per unit heat transferred to the water, of the OTSGs and water tube boilers is the same in all cases.

Capital Cost Assumptions:

Scope of supply for all cases includes all equipment, instruments, valves, piping, and structural steel shown within boundaries of block flow diagrams.

Equipment and costs not included in the cost estimate:

Water storage tanks

Control systems (PLC, DCS, etc.)

Motor control centers (MCC) transformers, switchgear, etc.

Installation cost

Infrastructure cost for foundations, underground piping, power systems, etc.

Plant life is 30 years.

TABLE 1

UTILITIES

| | FIG. 1 | FIG. 2 | FIG. 3 | FIG. 5 |
|---|---|---|---|---|
| Power (kw-hr/hour) | 3,871 | 18,665 | 19,289 | 3,528 |

TABLE 2

CHEMICAL CONSUMPTION
(Pounds/day as 100% chemical)

|  | FIG. 1 | FIG. 2 | FIG. 3 | FIG. 5 |
|---|---|---|---|---|
| Hydrochloric Acid (HCl) | 6,500 | 6,200 | 6,200 | 8,000 |
| Sodium Hydroxide (NaOH) | 7,000 | 10,200 | 12,200 | 12,100 |
| Lime (Ca(OH)$_2$) | 7695 | — | — | — |
| Magnesium Oxide (MgO) | 12,000 | — | — | — |
| Coagulant |  | 50 | — | — |
| RO Antiscalant | — | — | 200 | — |

TABLE 3

CAPITAL COST RATIOS

|  | FIG. 1 | FIG. 2 | FIG. 3 | FIG. 5 |
|---|---|---|---|---|
| Capital Cost | 1.20 | 1.25 | 1.30 | 1.0 |

TABLE 4

SLUDGE AND SALT CAKE

|  | FIG. 1 | FIG. 2 | FIG. 3 | FIG. 5 |
|---|---|---|---|---|
| Tons/Day | 115 | 63.6 | 64.7 | 65.7 |

TABLE 5

UNIT PROCESS STEPS REQUIRED FOR STEAM GENERATION

|  | FIG. 1 | FIG. 2 | FIG. 3 | FIG. 5 |
|---|---|---|---|---|
| Warm Lime Softening | X |  |  |  |
| Media Filtration | X |  |  |  |
| Ion Exchange System | X |  |  | X |
| Mechanical Vapor Compression |  | X | X |  |
| Primary Reverse Osmosis System |  |  | X |  |
| Produced Water Chillers |  |  | X |  |
| Produced Water Evaporation |  | X | X | X |
| High Pressure Produced Water Pump | X | X | X | X |
| Once Through Steam Generator | X | X |  |  |
| Steam Separators for 100% Quality Steam | X | X |  |  |
| Watertube Boiler |  |  | X | X |

As can be seen in Tables 1 and 3, the power consumption and capital cost are lower when the high pressure, high efficiency HiPVap method of steam generation, as presented herein, is incorporated into the steam flooding oil recovery methods in current use. When the lower costs are included with other benefits of the HiPVap process, such as reduced complexity of operation, fewer unit processes as shown in Table 6, increased corrosion resistance, it becomes apparent that the method, as taught herein, is a cost effective, novel, and new approach to overcoming aforementioned present day state of the art limitations and problems.

Benefits of HiPVap Process Design and Operation

Many exemplary and desirable process benefits provided by the HiPVap process design and operation were listed above. Detailed explanations of such benefits include:

(A) Fewer Unit Processes

It can be seen from Table 5 above that the HiPVap process is comprised of fewer individual unit operations than other steam generation processes. In the preferred embodiment as depicted by FIG. 5, the HiPVap process consists only of the high pressure evaporator and its accompanying commercial watertube boiler as a source of heat to drive the evaporation process. This feature reduces the complexity of produced water recovery for steam generation and leads to fewer operational and maintenance hours required.

The elimination of a requirement for a once through steam generator (OTSG) carries with it additional benefits chiefly of which is its designed low water to steam efficiency. This design factor is based on the poor wetting of heat exchange surfaces exhibited in current equipment which, in turn, leads to tube burn out at high temperatures and recovery due to dry spots, and tube plugging. The HiPVap, in contrast, is designed for high salinity high scaling probability waters which, by necessity, requires that heat exchange surfaces be thoroughly wetted at all times. Therefore, the rate of recirculation water over the heat transfer surface is much greater than the rate of steam vapor generation ensuring that dry spots cannot occur and that scaling potential is minimized.

(B) Reduced Capital Cost

The lowered corrosion potential that results from operating the HiPVap process with a high pH in the concentrated circulating solution allows the use of lower cost materials for heat transfer tubes or plates and other wetted surfaces that are contacted by the concentrated solution, such as sump walls. This is an important advantage since the costs of these materials have a substantial impact on the capital cost of an evaporator. In most cases the use of high cost duplex and AL6XN (6 percent minimum molybdenum) type stainless steels, which are normally used in high chloride salt solutions, can be eliminated in favor of lower grade materials such as carbon steel. In addition, fewer individual unit processes result in eliminated equipment and installation infrastructure costs.

(C) Reduced Operating Cost

The HiPVap process has a significant advantage over other evaporative processes in that high energy consuming mechanical vapor compressors are not required either in the steam generation phase or in the zero liquid discharge zone. The novel design disclosed herein operates entirely on heat and the recovery of waste heat in liquid blowdown streams. Other systems require large amounts of electrical power input for operation.

Produced water plant operating costs are also reduced due to minimizing, or eliminating, costly proprietary antiscalants and/or dispersants. Additional savings can be found by eliminating the need for seeded slurry operation at installations where the calcium and sulfate ions are at a high level in the produced water feed stream. Along with the cost of seeding evaporators with calcium sulfate crystals, there is also incurred costs associated with calcium chloride and/or sodium sulfate injected chemicals to provide enough precipitating ions to maintain the seed bed at many installations. Further savings can be realized by the reduction in frequency of cleaning operations, less expensive cleaning chemicals, less downtime for cleaning, and no requirement for costly physical cleaning operations. Still further, if the ZLD option is incorporated, the cost of disposing the waste blowdown is eliminated along with the requirement for freshwater makeup necessary to maintain process flows.

It will thus be seen that the objects set forth above, including those made apparent from the preceding description, are efficiently attained, and, since certain changes may be made in carrying out the above method and in construction of a suitable apparatus in which to practice the method and in which to produce the desired product as set forth herein, it is to be understood that the invention may be embodied in other specific forms without departing from the spirit or essential characteristics thereof. For example, while exemplary designs for a falling film high pressure evaporator along with hardness and alkalinity control methods have been illustrated and described, other embodiments are also feasible to attain the result of the principles of the method disclosed herein. Therefore, it will be understood that the foregoing description of representative embodiments of the invention have been presented only for purposes of illustration and for providing an understanding of the invention, and it is not intended to be exhaustive or restrictive, or to limit the invention to the precise forms disclosed. On the contrary, the intention is to cover all modifications, equivalents, and alternatives falling within the spirit and scope of the invention as expressed in the appended claims. As such, the claims are intended to cover the methods and structures described therein, and not only the equivalents or structural equivalents thereof, but also equivalent structures or methods. Thus, the scope of the invention, as indicated by the appended claims, is intended to include variations from the embodiments provided which are nevertheless described by the broad meaning and range properly afforded to the language of the claims, or to the equivalents thereof.

The invention claimed is:

1. A process for generating steam for downhole injection in a steam flood process for oil recovery, said process comprising:
   (a) heating a de-oiled produced water stream containing water, dissolved solutes, and dissolved gases, said dissolved solutes further comprising at least one molecular species which is at low ionization levels when in solution at around neutral pH,
   (b) raising the pH of said heated, produced water stream to maintain the solubility of said molecular species therein at a selected concentration factor,
   (c) pressurizing and directing said produced water stream to a circulating concentrated brine in a produced water evaporator, said evaporator having a plurality of heat transfer surfaces,
   (d) distributing said circulating brine across a first surface of at least one of said plurality of heat transfer surfaces to generate a steam vapor suitable for injection into a selected geological formation to fluidize oil,
   (e) discharging at least some of said brine as an evaporator blowdown stream,
   (f) distributing steam from a watertube boiler across a second surface of at least one of said plurality of heat transfer surfaces to condense said steam as a condensate,
   (g) returning said condensate to said watertube boiler for steam production, and,
   (h) discharging at least some of said condensate as a boiler blowdown to the produced water evaporator.

2. The process as set forth in claim 1, wherein said dissolved solutes further comprise hardness cations in a quantity that produces a scale deposition on said first surface of said heat transfer surfaces at said selected concentration factor.

3. The process as set forth in claim 2, wherein a portion or substantially all hardness cations are removed in a deionization zone.

4. The process as set forth in claim 1, wherein said produced water stream further comprises at least some non-hydroxide alkalinity.

5. The process as set forth in claim 4, wherein a portion or substantially all non-hydroxide alkalinity in said produced water stream is removed.

6. The process as set forth in claim 5, wherein the step of removing said non-hydroxide alkalinity, is further comprised of lowering the pH of said produced water stream to release at least some free carbon dioxide.

7. The process as set forth in claim 6, wherein the step of adjusting pH is accomplished by the addition of hydrochloric acid or sulfuric acid.

8. The process as set forth in claim 1, wherein the pH is raised to between 10 and 11 and maintained in said evaporator circulating brine.

9. The process as set forth in claim 1, wherein the pH is raised to between 11 and 12 and maintained in said evaporator circulating brine.

10. The process as set forth in claim 1, wherein the pH is raised to between 12 and 13 and maintained in said evaporator circulating brine.

11. The process as set forth in claim 1, wherein the pH is raised to greater than or at least about 13 and maintained in said evaporator circulating brine.

12. The process according to claim 1, wherein the step of raising the pH is accomplished by addition of an inorganic base in aqueous solution, said base selected from the group consisting of sodium hydroxide, and potassium hydroxide.

13. The process according to claim 1, wherein said produced water evaporator comprises a falling thin film evaporator, operating as a single unit, or operating in parallel, to generate said steam and said blowdown stream.

14. The process according to claim 1, wherein said produced water evaporator comprises a rising film or thermosiphon evaporator, operating as a single unit, or operating in parallel, to generate said steam and said blowdown stream.

15. The method according to claim 1, wherein said heat transfer surfaces are tubular.

16. The method as set forth in claim 15, wherein said heat transfer surfaces are operated in a vertical position.

17. The method as set forth in claim 15, wherein said heat transfer surfaces are operated in a horizontal position.

18. The method as set forth in claim 15, wherein said heat transfer surfaces are designed for enhanced heat transfer.

19. The process as set forth in claim 15 wherein said circulating brine is heated on the interior of the tubes.

20. The process as set forth in claim 15 wherein said circulating brine is heated on the exterior of the tubes.

21. The process according to claim 1, wherein said produced water evaporator comprises falling film and rising film in a combined process, operating as a single unit, or operating in parallel, to generate said steam and said blowdown stream.

22. The process as set forth in claim 1, further comprising distributing said circulating brine across a first heat transfer surface of at least one of said plurality of heat transfer tubes to generate a steam vapor.

23. The process as set forth in claim 22, further comprising collecting said steam vapor and directing it to an injection well present in a selected geological formation, to produce an oil and water mixture.

24. The process as set forth in claim 22, wherein said steam vapor generated is at a pressure ranging from 200 to 1600 psig.

25. The process as set forth in claim 1, further comprising the step of treating said produced water evaporator blowdown stream in a zero liquid discharge process.

26. The process as set forth in claim 25, wherein said zero liquid discharge comprises a steam driven multiple effect concentration and crystallization evaporator process to generate (a) high quality steam vapor and, (b) a high solute, high suspended solids slurry.

27. The process as set forth in claim 26, further comprising, dewatering said generated suspended solids slurry in a filter press or belt filter and, further comprising, recycling the filtrate back to the crystallization effect of the multiple effect evaporator.

28. The process as set forth in claim 25, wherein said zero liquid discharge comprises a steam driven crystallizer evaporator process to generate (a) high quality steam vapor and, (b) a high solute, high suspended solids slurry, and, further comprising, dewatering said generated suspended solids slurry in a filter press or belt filter and, further comprising, recycling the filtrate back to the inlet of the crystallizer evaporator.

29. The process as set forth in claim 1, further comprising the step of injecting said produced water evaporator blowdown stream in a deep well for disposal.

30. The process as set forth in claim 1, further comprising supplying said water tube boiler with de-ionized makeup water to produce said steam and a high solute containing blowdown stream.

31. The process as set forth in claim 30, wherein said de-ionized makeup water is produced by a reverse osmosis unit.

32. The process as set forth in claim 30, wherein said de-ionized makeup water is produced by an ion exchange unit.

33. The process as set forth in claim 31 or claim 32, wherein the feed water utilized for de-ionized makeup water is fresh water.

34. The process as set forth in claim 1, wherein said molecular species is silica.

* * * * *